(12) United States Patent
Koike et al.

(10) Patent No.: US 9,126,298 B2
(45) Date of Patent: Sep. 8, 2015

(54) MACHINING CENTER

(75) Inventors: Shinji Koike, Aiko-gun (JP); Kazumasa Nakayasu, Aiko-gun (JP); Yoshitaka Yamaguchi, Aiko-gun (JP)

(73) Assignee: Markino Milling Machine Co., Ltd., Tokyo (JP)

( * ) Notice: Subject to any disclaimer, the term of this patent is extended or adjusted under 35 U.S.C. 154(b) by 210 days.

(21) Appl. No.: 14/000,544

(22) PCT Filed: Feb. 24, 2011

(86) PCT No.: PCT/JP2011/054824
§ 371 (c)(1),
(2), (4) Date: Aug. 20, 2013

(87) PCT Pub. No.: WO2012/114533
PCT Pub. Date: Aug. 30, 2012

(65) Prior Publication Data
US 2013/0331245 A1     Dec. 12, 2013

(51) Int. Cl.
*B23Q 3/157*     (2006.01)
*B23Q 11/08*     (2006.01)
*B23Q 3/155*     (2006.01)

(52) U.S. Cl.
CPC ........ *B23Q 3/15526* (2013.01); *B23Q 3/15706* (2013.01); *B23Q 11/08* (2013.01); *B23Q 3/15533* (2013.01); *B23Q 11/0891* (2013.01);
(Continued)

(58) Field of Classification Search
CPC ..................... Y10T 483/115; Y10T 483/1795; Y10T 483/1793; Y10T 483/179; Y10T 483/1743; Y10T 483/1745; Y10T 483/1882

USPC .......................... 483/3, 56, 55, 54, 34, 35, 67
See application file for complete search history.

(56) References Cited

U.S. PATENT DOCUMENTS

| | | | |
|---|---|---|---|
| 4,679,296 A * | 7/1987 | Watanabe et al. | 483/57 |
| 5,342,275 A * | 8/1994 | Yanase et al. | 483/1 |

(Continued)

FOREIGN PATENT DOCUMENTS

| | | |
|---|---|---|
| EP | 1 116 548 | 7/2001 |
| JP | 2001-198751 | 7/2001 |

(Continued)

OTHER PUBLICATIONS

Machine Translation of JP 2009-039786, which JP '786 was published Feb. 2009.*

(Continued)

*Primary Examiner* — Erica E Cadugan
(74) *Attorney, Agent, or Firm* — Morrison & Foerster LLP (57) ABSTRACT

A machining center includes a rotatable tool magazine (22) arranged above a work space (WS) facing a spindle (15) tilted so that the spindle side becomes lower and having a plurality of grippers (24) for holding tools (16) in a circumferential direction, and a shutter (26) arranged below the tool magazine (22) to be able to open and close facing the spindle side. The tool magazine (22) has a tool-free area (AR2) where there are no grippers (24) at a part of the circumferential direction and a tool-holding area (ARA) where there are grippers (24) at another part of the circumferential direction. The tool magazine (22) is controlled in rotation so that when the shutter (26) is closed, the tool-free area (AR2) moves to the spindle side while when the shutter (26) is open, the tool-holding area (AR1) moves to the spindle side.

4 Claims, 11 Drawing Sheets

(52) U.S. Cl.
CPC .......... *Y10T 483/115* (2015.01); *Y10T 483/179* (2015.01); *Y10T 483/1743* (2015.01); *Y10T 483/1795* (2015.01); *Y10T 483/1882* (2015.01)

(56) References Cited

U.S. PATENT DOCUMENTS

| | | | | |
|---|---|---|---|---|
| 6,077,206 | A | * | 6/2000 | Azema ............................. 483/3 |
| 6,685,608 | B2 | * | 2/2004 | Menzio ............................ 483/3 |
| 6,786,856 | B2 | * | 9/2004 | Kato et al. ....................... 483/3 |
| 7,229,395 | B2 | * | 6/2007 | Yoshida ........................... 483/3 |
| 7,267,642 | B2 | * | 9/2007 | Arai et al. ........................ 483/3 |
| 7,316,639 | B2 | * | 1/2008 | Schmauder ..................... 483/67 |
| 8,308,621 | B2 | * | 11/2012 | Shih ................................ 483/3 |
| 2001/0041651 | A1 | * | 11/2001 | Abe et al. ......................... 483/3 |
| 2014/0090517 | A1 | * | 4/2014 | Suzuki et al. .................. 74/814 |

FOREIGN PATENT DOCUMENTS

| | | |
|---|---|---|
| JP | 2002-66856 | 3/2002 |
| JP | 2004-98212 | 4/2004 |
| JP | 2009-39786 | 2/2009 |

OTHER PUBLICATIONS

Machine Translation of JP 2002-066856, which JP '856 was published Mar. 2002.*

International Search Report mailed Apr. 5, 2011, directed to International Application No. PCT/JP2011/054824; 3 pages.

Extended European Search Report dated Jun. 20, 2014, directed to EP Application No. 11859419.1; 6 pages.

* cited by examiner

MACHINING CENTER

REFERENCE TO RELATED APPLICATIONS

This application is the national stage application under 35 USC 371 of International Application No. PCT/JP2011/054824, filed Feb. 24, 2011, the entire contents of which are incorporated herein by reference.

FIELD OF THE INVENTION

The present invention relates to a machining center which has an automatic tool changing function.

BACKGROUND OF THE INVENTION

There is a known machining center, in which a tool magazine is attached above a work space in a rotatable manner and tools are automatically changed between the tool magazine and a spindle (for example, see Patent Literature 1). The machining center described in this PLT 1 is provided at the front of the spindle with a door which can open and close facing the work space for carrying out the work of changing workpieces in the work space. Furthermore, in order to facilitate the workpiece changing work, etc., the tool magazine is provided tilted so that the door side becomes higher and the spindle side becomes lower.

However, when providing the tool magazine tilted like in the machining center described in the above Patent Literature 1, the machining center easily becomes high in overall height. In particular, when providing an openable and closeable shutter as a partition wall in the horizontal direction between the work space and the tool magazine, it is necessary to attach the tool magazine in a position so as to not interfere with the shutter. For this reason, the machining center easily becomes much higher in overall height and the stability of the machine is impaired.

Japanese Unexamined Patent Publication No. 2002-66856A

SUMMARY OF THE INVENTION

The machining center according to the present invention includes: a spindle to which a tool is attached in a detachable manner; a tool magazine provided in a tilted posture above a work space facing the spindle so that a side of the spindle becomes lower, the tool magazine being rotatable and indexable and having a plurality of tool holding parts for holding tools changed with the spindle in a circumferential direction; a shutter arranged in an openable and closable manner at a boundary part of the tool magazine and the work space; a rotation drive unit rotating the tool magazine; an opening and closing drive unit opening closing the shutter; and a control unit controlling the rotation drive unit and the opening and closing drive unit, wherein the tool magazine has a tool-free area in which there are no tool holding parts at a part of the circumferential direction and a tool-holding area in which there are tool holding parts at another part of the circumferential direction, and the control unit controls the rotation drive unit and the opening and closing drive unit so that when the shutter is open, the tool-holding area moves to the side of the spindle and so that when the tool-free area moves to the side of the spindle side, the shutter closes.

DETAILED DESCRIPTION OF THE INVENTION

Figure 1:
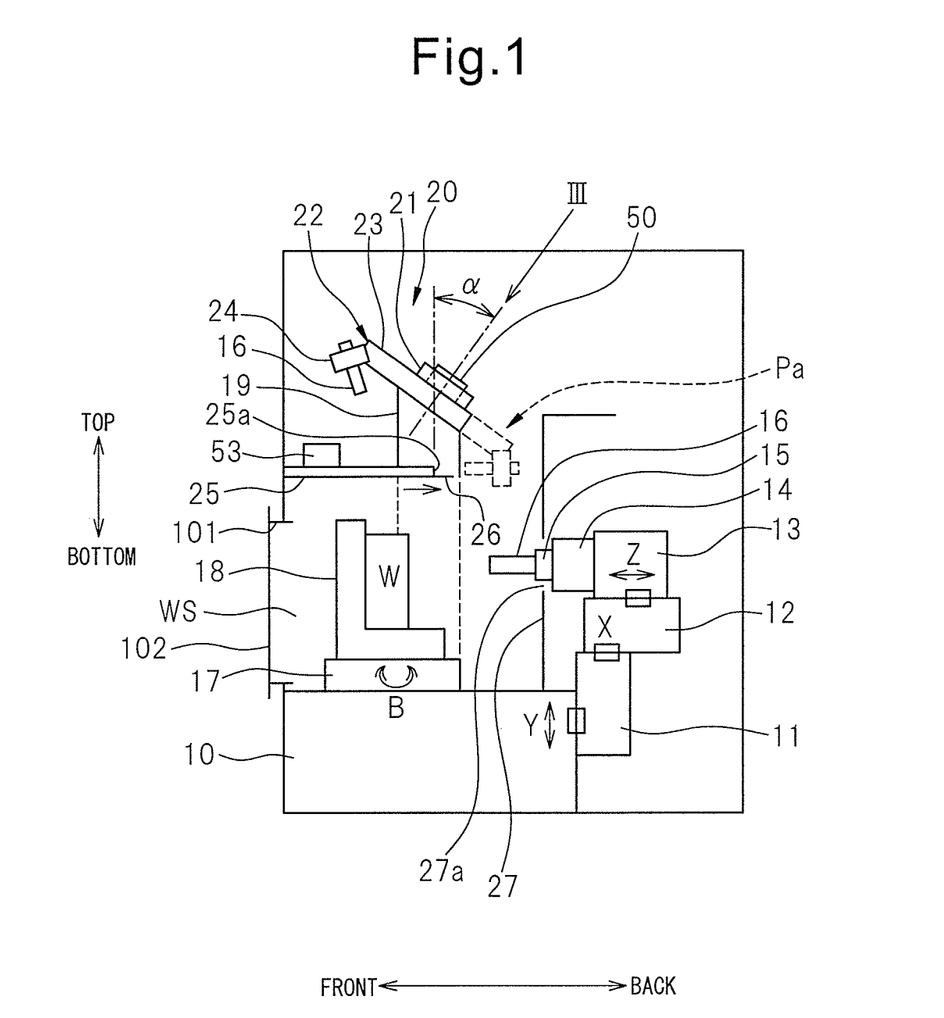
FIG. 1 is a side view which shows a schematic configuration of a machining center according to an embodiment of the present invention.
Figure 2:
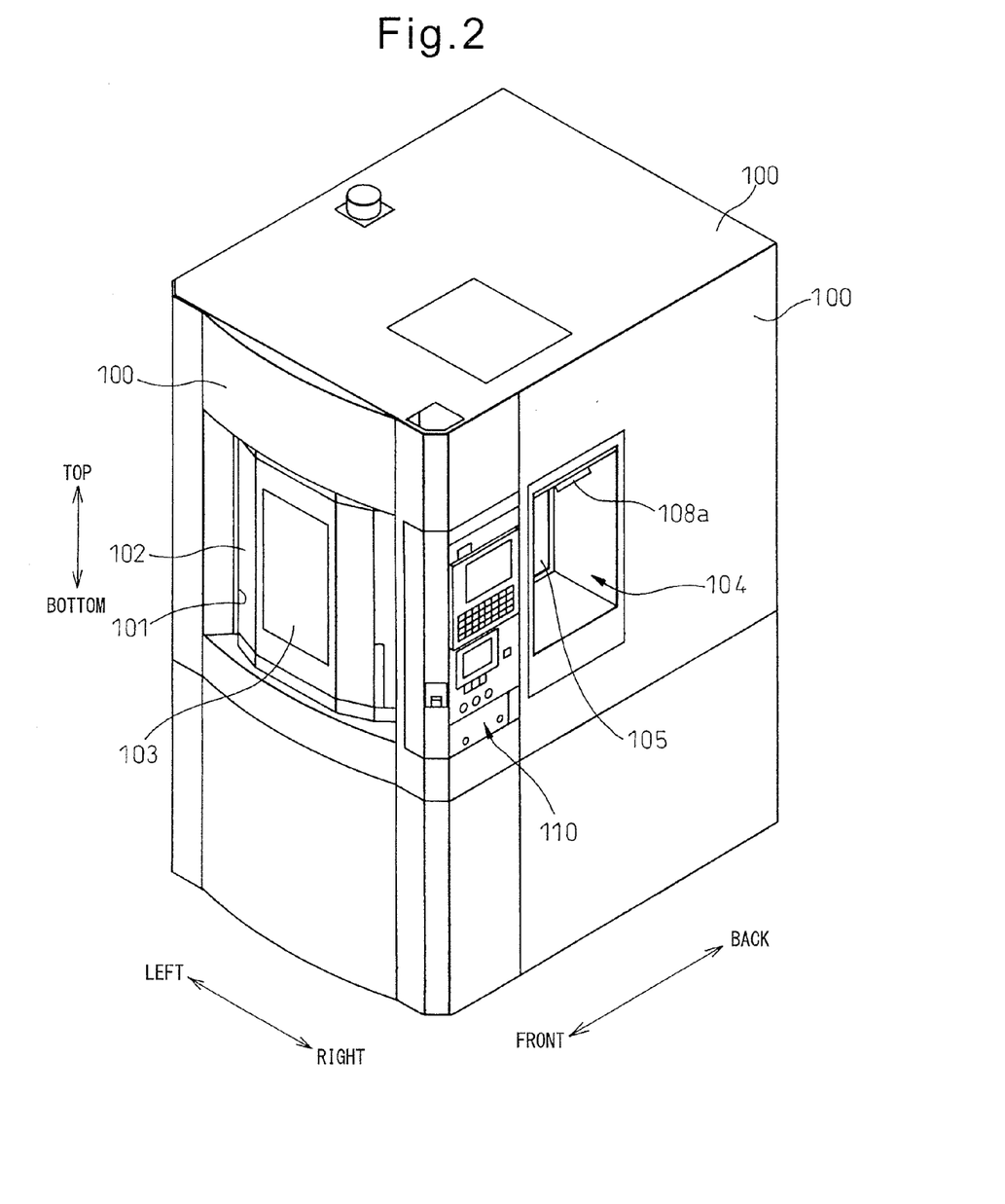
FIG. 2 is a perspective view of the appearance of the machining center according to the embodiment of the present invention.

Hereinafter, referring to FIG. 1 to FIG. 12, an embodiment of a machining center according to the present invention will be explained. FIG. 1 is a side view which shows the schematic configuration of the machining center according to the embodiment of the present invention, while FIG. 2 is a perspective view of the appearance of this machining center. Below, as illustrated for convenience, a front-back direction, left-right direction, and up-down direction are defined and the configurations of the parts are explained in accordance with these definitions.

As shown in FIG. 1, at the back surface of bed 10, an up-down movement member 11 is supported movably in the up-down direction (Y-axis direction) through a linear feed mechanism. At the top surface of the up-down movement member 11, a left-right movement member 12 is supported movably in the left-right direction (X-axis direction) through a linear feed mechanism. At the top surface of the left-right movement member 12, a front-back movement member 13 is supported movably in the front-back direction (Z-axis direction) through a linear feed mechanism. At the front part of the front-back movement member 13, a spindle head 14 is provided. At the spindle head 14, a tool 16 is attached through a spindle 15 which can rotate about the axis of rotation in the front-back direction. The up-down direction, left-right direction, and front-back direction linear feed mechanisms are, for example, comprised of guide devices including guide rails and guide blocks and drive devices including ball screws and servo motors which drive the rotation of the ball screws. A tool 16 is driven to rotate by a spindle motor inside the spindle head 14.

At the top surface of the bed 10, a table 17 is carried rotatably about an axis in the vertical direction. At the top surface of the table 17, an angle rest 18 is carried. At the front surface of the angle rest 18, a workpiece W is attached facing the front end of the tool 16. Due to this configuration, the tool 16 can move relative to the workpiece W in three orthogonal axis directions (X-, Y-, Z-axis directions) and a single rotational axis direction (B-axis direction) and can machine the workpiece W to a desired shape. Furthermore, the table 17 may be configured rotatably about an axis in the front-back direction so as to configure the machining center as a 5-axis machine tool which enables relative movement in the three orthogonal axis directions and two rotational axis directions (B- and C-axis directions).

At the left and right sides of the bed 10, a pair of left and right support columns 19 are provided to stand. At the top ends of the support columns 19, a tool changing device 20 is provided. The tool changing device 20 has a magazine base 21 which is installed across the top ends of the left and right support columns 19 and a tool magazine 22 which is supported rotatably at the magazine base 21. The magazine base 21 is provided in a tilted posture so that its front side becomes high and is rear side becomes low. The tool magazine 22 is similarly provided in a tilted posture. That is, the tool magazine 22 is inclined so that the angle formed by the vertical line and the axis of rotation of the tool magazine 22 becomes a predetermined tilt angle α.

Figure 3:
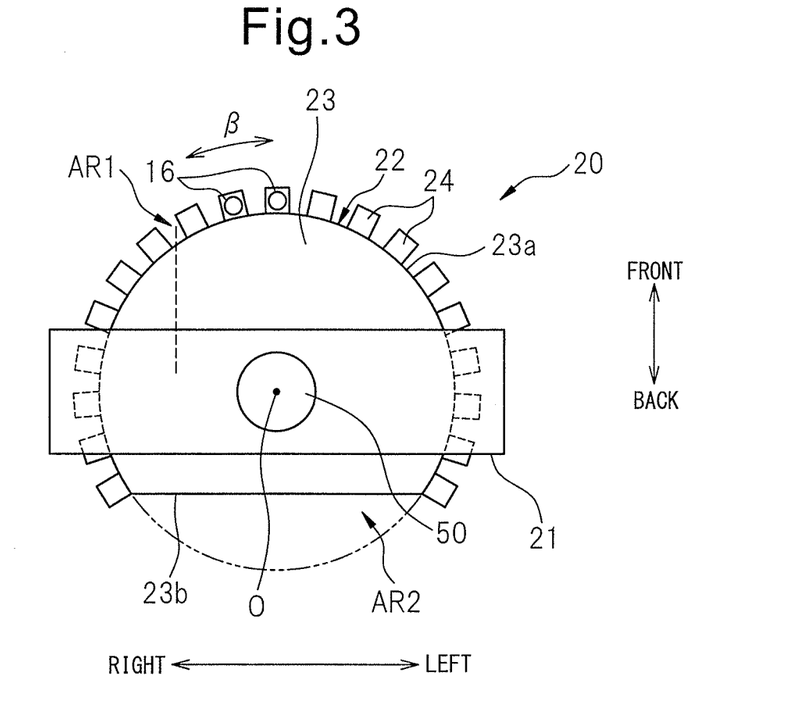
FIG. 3 is a view along an arrow III of FIG. 1.

FIG. 3 is a back view of the tool changing device 20, that is, a view of the tool changing device 20 seen from the tilt angle α direction (view along an arrow III of FIG. 1). As shown in FIGS. 1 and 3, at the center part of the magazine base 21 in the left-right direction, a motor 50 for indexing the tool magazine 22 (indexing motor) is fastened. The tool magazine 22 has a rotating frame 23 and a plurality of tool holding parts, that is, grippers 24, which are attached at the circumference of the rotating frame 23. An output shaft of the indexing motor 50 is connected with the center of rotation part of the rotating frame 23, while the tool magazine 22 is supported at the magazine base 21 rotatably about a point "O" of FIG. 3 in the arrow β direction. The indexing motor 50 is, for example, configured by a servo motor.

As a characterizing feature of the present embodiment, as shown in FIG. 3, the rotating frame 23 is shaped as a circle with part cut in a straight line. That is, the outer shape of the rotating frame 23 is defined by an arc part 23a and a chord part 23b. The arc part 23a is provided with a plurality of grippers 24 at equal intervals in the circumferential direction. At the respective grippers 24, tools 16 for change-use are held in a detachable manner. A tool-holding area AR1 is therefore formed at the circumference of the tool magazine 22. On the other hand, the chord part 23b is not provided with grippers 24. A tool-free area AR2 is therefore formed at the circumference of the tool magazine 22. In FIGS. 1 and 3, the tool magazine 22 is in a rotation reference state. At the rotation reference state, the chord part 23b extends in the left-right direction behind the center of rotation "O", so the tool-free area AR2 is present at the rear.

Figure 4:
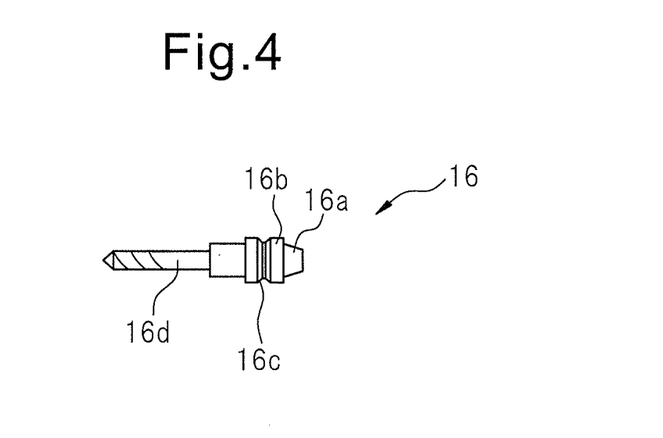
FIG. 4 is a side view which shows an example of a tool which is used for the machining center of FIG. 1.

FIG. 4 is a side view which shows an example of a tool 16 which is held at a gripper 24. The tool 16 has, along the axis of rotation, a shank 16a, flange 16b, V-groove 16c, and tool part 16d (in the figure, a drill). The circumferential surface of the shank 16a forms a tapered shape which narrows toward the back end face and is tightly fit in a taper hole (not shown) at the front end of the spindle 15 where it is clamped by a clamping device 54 (FIG. 12) provided at the spindle 15. The clamping device 54 is a known one, for example, a draw bar with a collet which pulls in the shank 16a of the tool 16 to the rear of the spindle 15.

At the time of tool changing, for example, the tool magazine 22 is rotated so that, as shown by the dotted line in FIG. 1, a tool 16 attached to the gripper 24 moves to a tool changing position Pa where the tool is the lowest part and the backmost part. At this tool changing position Pa, the tool 16 is held at the gripper 24 while inclined with respect to the tool magazine 22 by an angle corresponding to the tilt angle α so that the axial direction of the tool 16 is directed toward the front-back direction.

Between the workpiece W and the tool magazine 22, a horizontal cover 25 is laid in the horizontal direction so as to separate the work space WS and the tool magazine 22. This horizontal cover 25 has the function of preventing cutting scraps and machining fluid from being splattered to the tool magazine 22. At the back part of the horizontal cover 25, a substantially rectangular shaped opening part 25a seen from a plan view (see FIG. 7) is provided corresponding to the tool changing position Pa. The horizontal cover 25 is provided with a shutter 26 slidably in the front-back direction. The shutter 26 is driven by an opening and closing use cylinder 53 to slide in the front-back direction so that the shutter 26 opens and closes the opening part 25a. The opening and closing use cylinder 53 is, for example, configured by an air cylinder. The shutter 26 may be configured as a type which slides in the left-right direction, as a butterfly hinge type, or as any other type.

On the other hand, at the front of the movement members 11 to 13, a spindle head cover 27 is provided to stand. Below the horizontal cover 25 and in front of the spindle head cover 27, a work room (work space) WS is formed. The spindle head cover 27 is provided with an opening part 27a. Through the opening part 27a, the spindle 15 and tool 16 pass through the spindle head cover 27. The spindle head cover 27 can be rolled up in the up-down direction and left-right direction. Along with the up-down movement and left-right movement of the tool 16, the opening part 27a also moves up-down and left-right.

As shown in FIG. 2, the machining center forms a substantially box shape as a whole. The front and back surfaces, left and right surfaces, and top and bottom surfaces are covered by covers 100. The front surface cover 100 is provided with an opening part 101. The opening part 101 is opened and closed by a door 102 slidable in the left-right direction. In the state with the door 102 opened, work is carried out for changing workpieces W inside the work space WS. The door 102 is provided with a monitoring use window 103.

Figure 5:
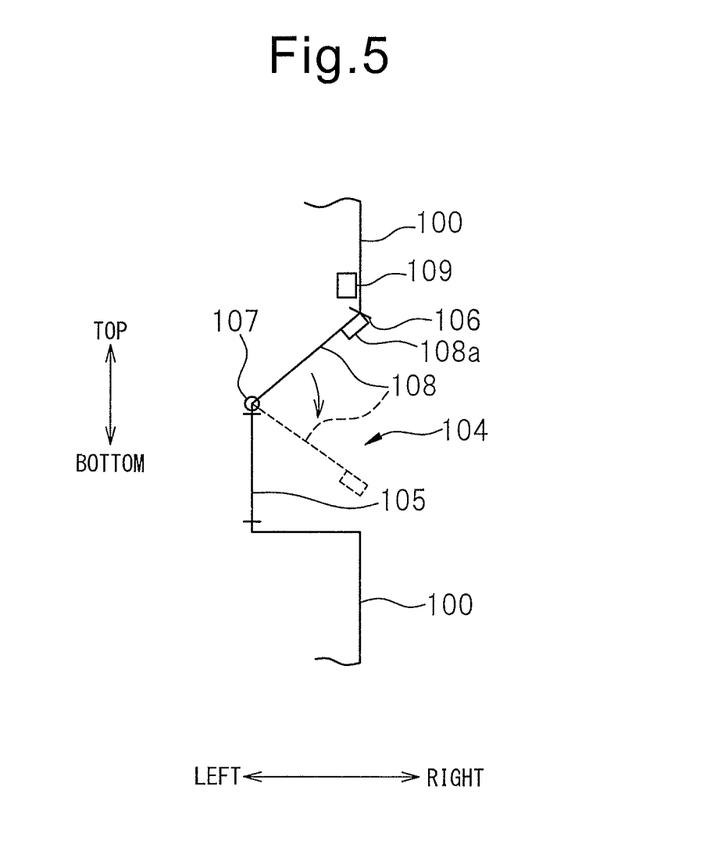
FIG. 5 is a longitudinal cross-sectional view which schematically shows the configuration of a recessed part of FIG. 2.
Figure 12:
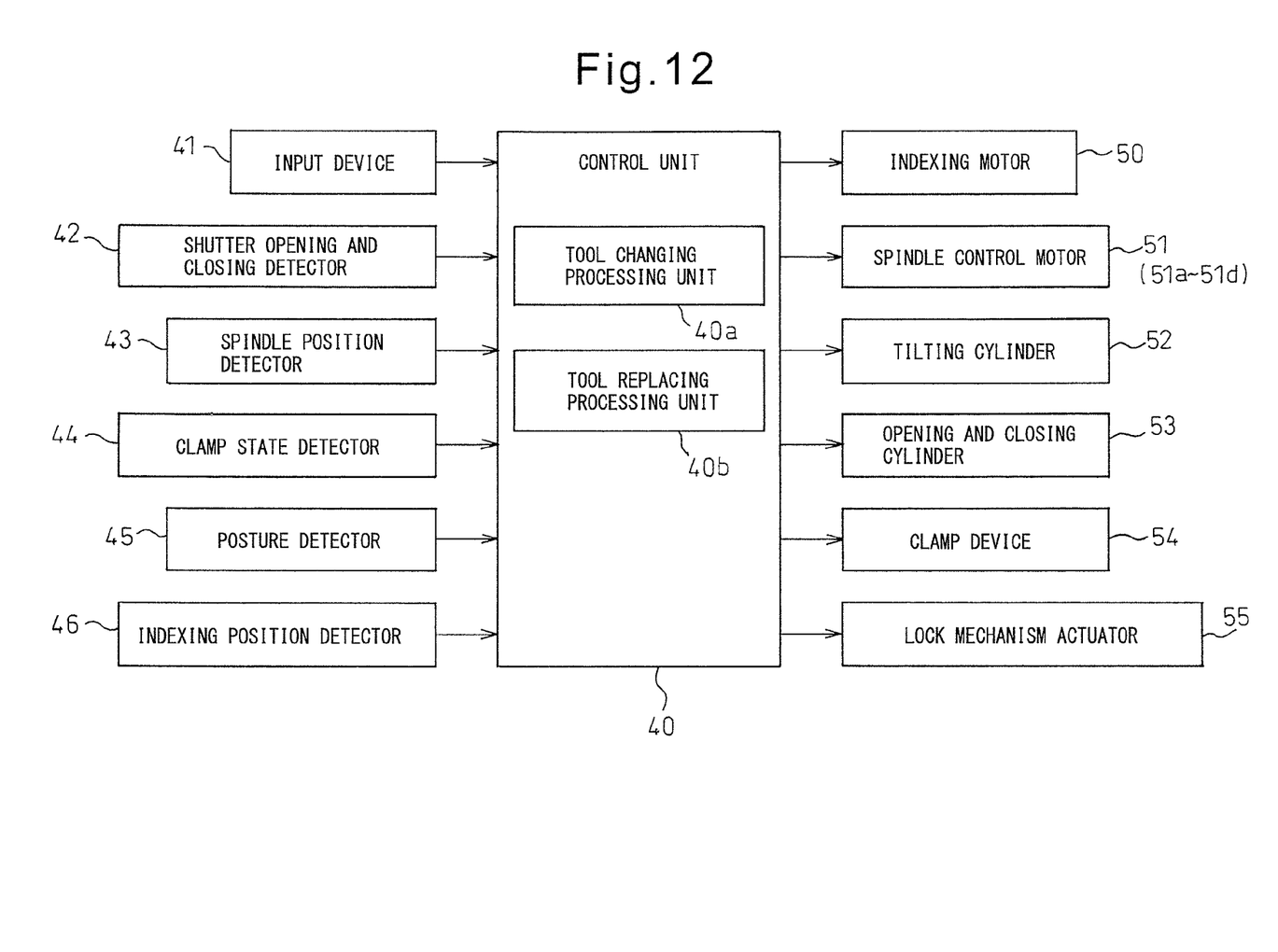
FIG. 12 is a block diagram which shows the configuration of a control device of the machining center according to the embodiment of the present invention.

Part of the right surface cover 100 is depressed inward (left) whereby a recessed part 104 is formed. At the front side of the recessed part 104 of the right surface cover 100, a control panel 110 is provided. FIG. 5 is a vertical cross-sectional view which schematically shows the configuration of the recessed part 104. At the deep surface (left surface) of the recessed part 104, a monitoring use window 105 is attached. The top surface of the recessed part 104 is formed by a slanted surface which is slanted toward the bottom left. At the top surface, an opening part 106 is formed. The opening part 106 is closed by a door 108 which can swivel about a hinge part 107 in the up-down direction. The door 108 is provided with a lock mechanism 109 which operates by an actuator 55 (FIG. 12). The lock mechanism 109 unlocks or locks the door 108. At the top end of the door 108, a handle 108a is attached. In the state where the lock mechanism 109 is unlocked, the handle 108a is gripped to open the door 108 so that the later explained work of replacing the tools 16 is carried out.

Figure 6:
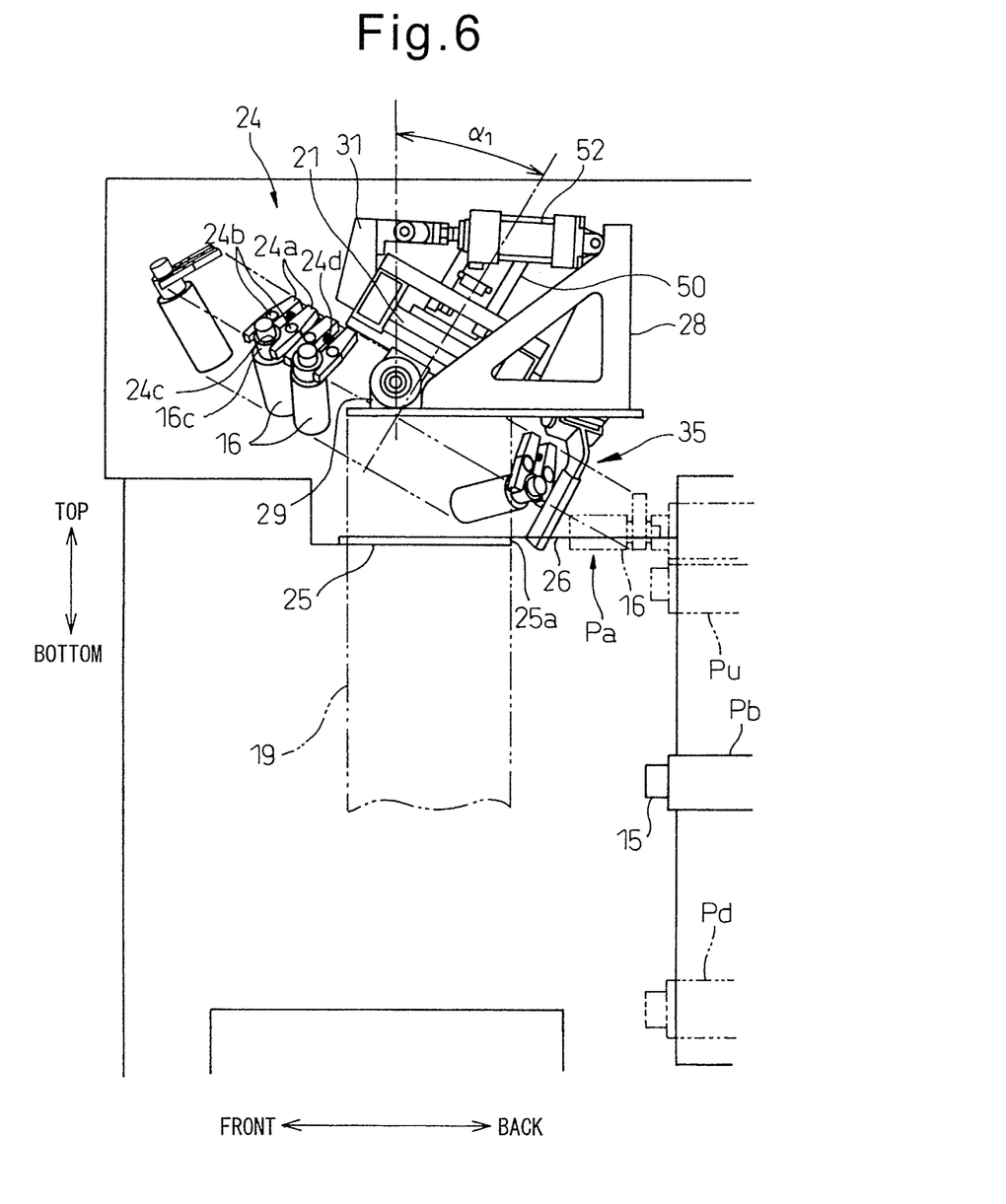
FIG. 6 is a side view of principal parts of the machining center which shows the configuration of a tool changing device according to the embodiment of the present invention in more detail and shows a first tilted posture of the tool magazine.
Figure 7:
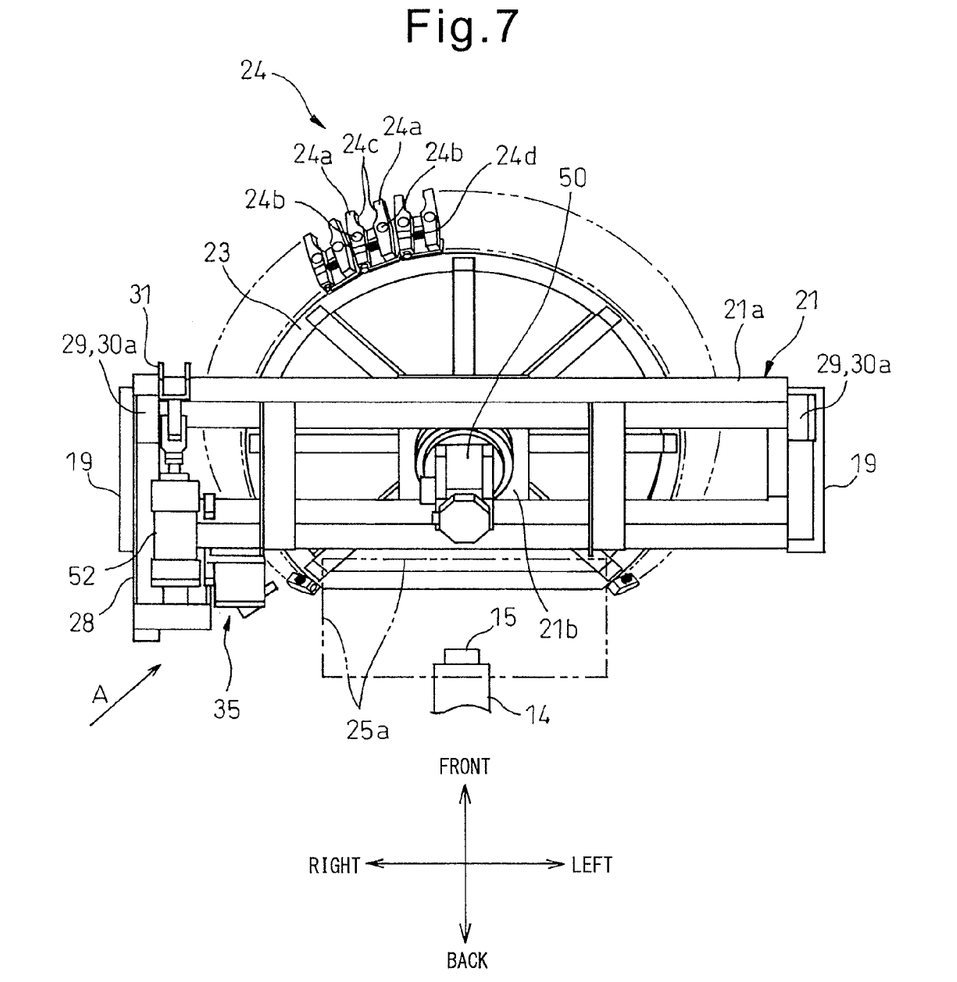
FIG. 7 is a plan view of principal parts of the machining center which shows the configuration of a tool changing device according to the embodiment of the present invention in more detail.

FIG. 6 is a side view of principal parts of a machining center which shows the configuration of the tool changing device 20 in more detail (view seen from left side), while FIG. 7 is a plan view of principal parts. In FIGS. 6 and 7, the illustration of the grippers 24 is partially omitted. Furthermore, in FIG. 7, illustration of the tools 16 which are held by the grippers 24 is omitted.

As shown in FIGS. 6 and 7, the magazine base 21 has a frame part 21a of a substantial rectangular shape seen in a plan view and a motor support part 21b which is arranged at the center of the frame part 21a. At the motor support part 21b, an indexing motor 50 is fastened. At the top end of one (left side) support column 19, a bracket 28 is fastened.

Figure 8:
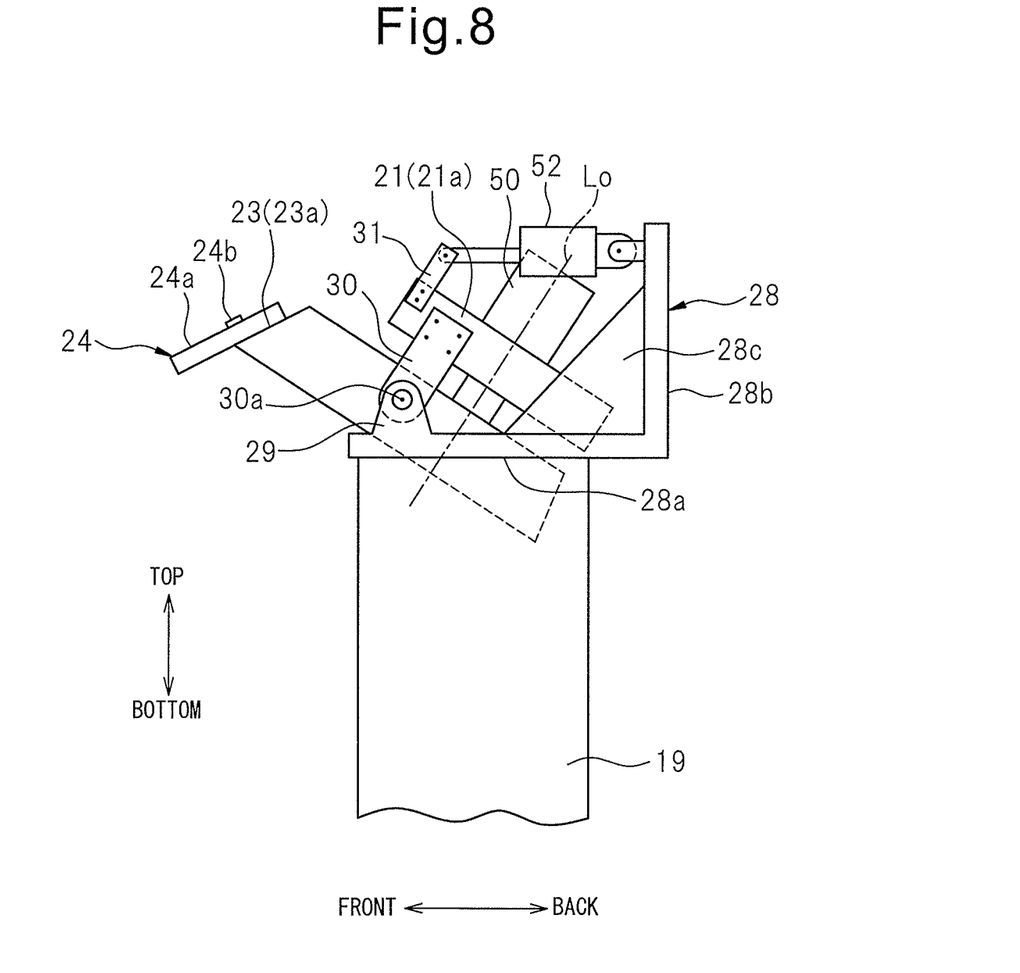
FIG. 8 is a side view which schematically shows the configuration of a support part of a magazine base of FIGS. 6 and 7.

FIG. 8 is a side view which schematically shows a configuration of a support part of the magazine base 21. As shown in FIG. 8, the bracket 28 has a base plate 28a which is fastened to the top surface of the support column 19, a vertical plate 28b which rises upward from the back end of the base plate 28a, and a substantially triangular shape reinforcing rib 28c which is laid between the base plate 28a and vertical plate 28b. The front end of the base plate 28a is provided with a bearing 29. The bearings 29 are provided at the top ends of the left and right support columns 19.

At the left and right side end faces of the frame part 21a of the magazine base 21, one ends of stays 30 are fastened. The stays 30 extend downward, while the other ends of the stays 30 are provided with shaft parts 30a which are provided so as to protrude facing the outsides in the left-right direction. The shaft parts 30a are inserted into the left and right bearings 29 in a rotatable manner. Due to this, the magazine base 21 is supported pivotally at the left and right support columns 19 through the stays 30 or the stays 30 and bracket 28.

As shown in FIG. 6 to FIG. 8, at the front end and left side end of the frame part 21a of the magazine base 21, a projecting member 31 is provided so as to protrude facing toward the top. At the top end of the projecting member 31, one end of a tilt use cylinder 52 is rotatably supported. The other end of the tilt use cylinder 52 is rotatably supported at the top end of the bracket 28 (vertical plate 28b). The tilt use cylinder is, for example, configured by an air cylinder. By drive of the tilt use cylinder 52, it is possible to tilt the tool magazine 22 (rotating frame 23) about the shaft parts 30a. Due to this, the tilt angle α of the tool magazine 22 with respect to the vertical line can be changed.

Figure 9:
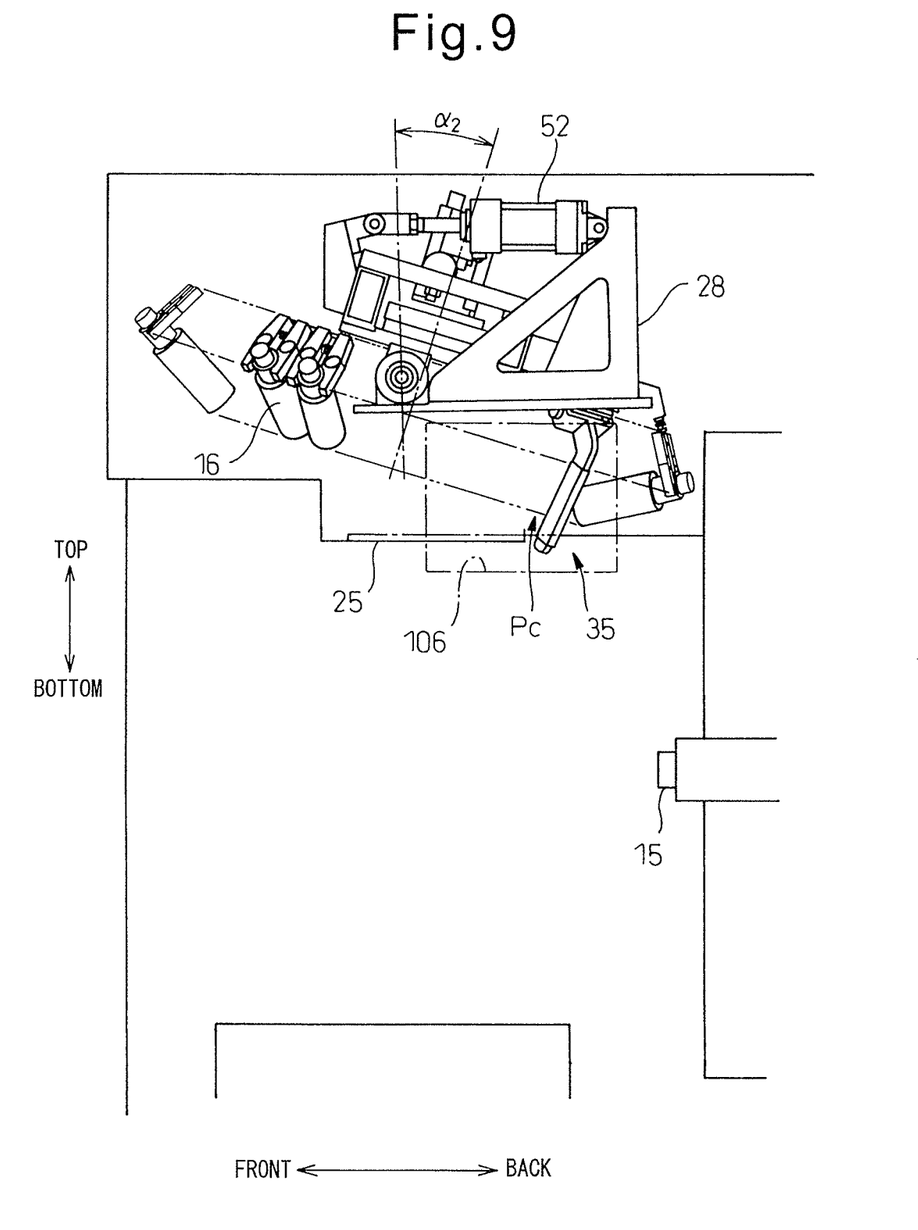
FIG. 9 is a view which shows a second tilted posture of the tool magazine.

FIG. 6 shows a first tilted posture where the tilt use cylinder 52 is retracted the most. The tilt angle α of the tool magazine 22 in this case is α1 (for example, 30°). On the other hand, FIG. 9 shows a second tilted posture where the tilt use cylinder 52 is extended the most. The tilt angle α of the tool magazine 22 in this case is α2 (for example, 18°). The first tilted posture is a posture suited to tool change for changing the tool 16 which is attached to the spindle 15, while the second tilted posture is a posture suited to tool replacement for replacing the tools 16 which are held in the tool magazine 22. In the second tilted posture, the position of the bottommost part of the tool 16 which is held at the tool magazine 22 becomes higher, so the tool magazine 22 can rotate without interference with the shutter 26 regardless of whether the shutter 26 is closed or open.

As shown in FIG. 8, the circumferential surface of the rotating frame 23 at the arc part 23a is formed slanted in a conical shape with respect to the axis of rotation L0. A plurality of grippers 24 are attached to this slanted surface. As shown in FIGS. 6 and 7, the grippers 24 have pairs of gripping members 24a which are arranged facing each other in the circumferential direction. The gripping members 24a are supported rotatably about the arc part 23a through pins 24b.

Below the pins 24b, at the insides of the pairs of gripping members 24a, curved projecting parts 24c are provided corresponding to the V-grooves 16c of the tools 16 (FIG. 4). On the other hand, above the pins 24b, springs 24d are interposed at the insides of the pairs of gripping member 24a. Due to the biasing forces of the springs 24d, the tools 16 are held at the curved projecting parts 24c.

When a gripper 24 is at the tool changing position Pa, as shown by the dashed line in FIG. 6, it is possible to attach or detach a tool to or from the gripper 24 against the biasing force of the spring 24d by moving the spindle 15 up-down and front-back. That is, it is possible to transfer a tool 16 from the spindle 15 to the gripper 24 or from the gripper 24 to the spindle 15, and thus the tool at the spindle 15 can be changed. In this way, a tool change is carried out automatically by movement of the spindle 15, while tool replacement is carried out manually using a tool replacing device 35 which is attached to the bottom part of the bracket 28.

Figure 10:
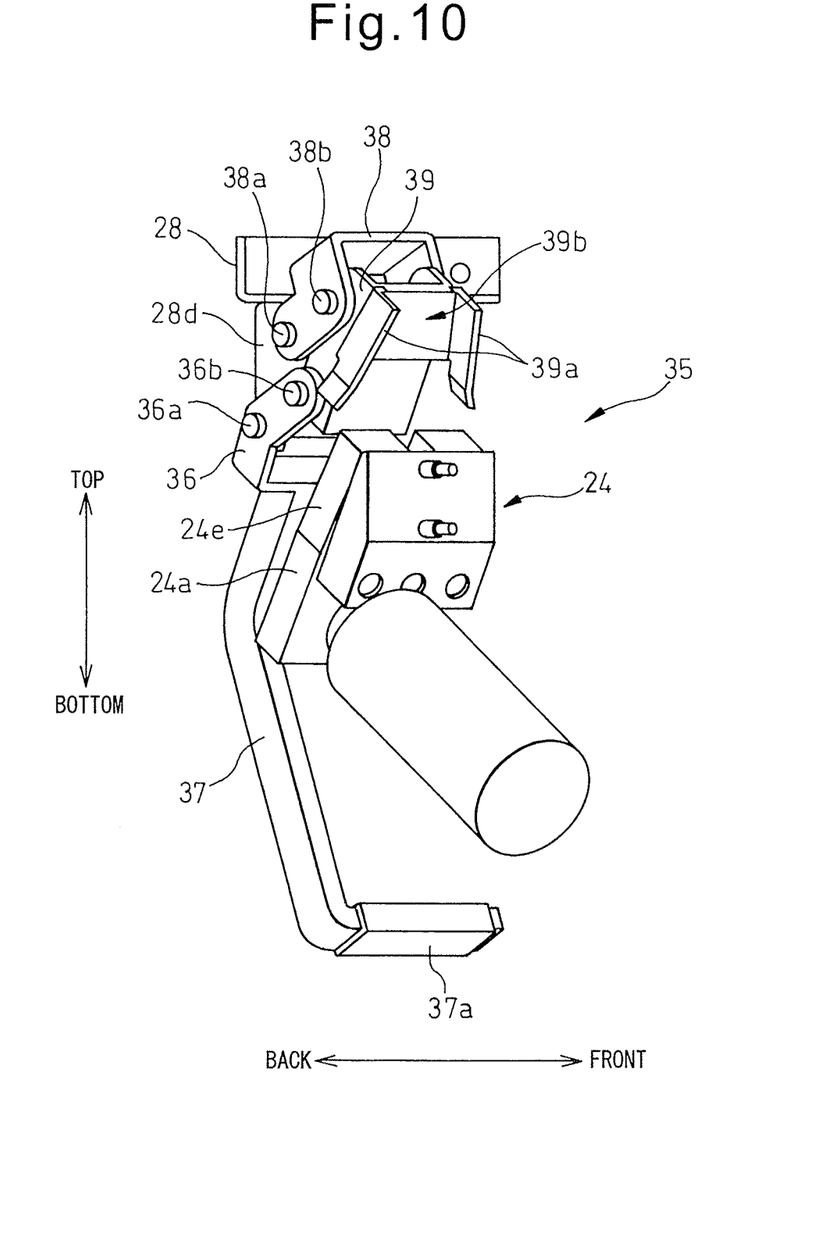
FIG. 10 is a view which shows the configuration of a tool replacing device according to the embodiment of the present invention.
Figure 11A:
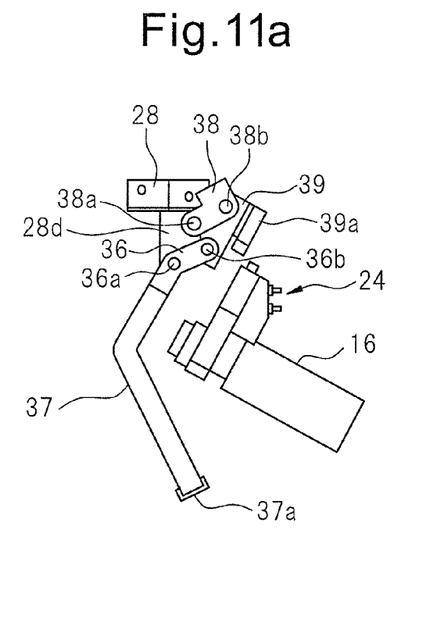
FIG. 11a to FIG. 11d are views which explain a tool replacing operation by using the tool replacing device of FIG. 10.

FIG. 10 is a view of the tool replacing device 35 seen from the right, while FIG. 11a is a side view of the tool replacing device 35. The tool replacing device 35 is provided facing the center of rotation of the tool magazine 22, that is, toward the arrow A direction of FIG. 7, while FIG. 10 shows the tool replacing device 35 as a perspective view.

As shown in FIGS. 10 and 11a, at the bottom part of the bracket 28, a support part 28d is provided sticking out downward. At the bottom end of the support part 28d, one end of the first link member 36 is attached pivotally about a shaft 36a. At the bottom end of the first link member 36, a bent shaped lever 37 which is bent to the outside so as not to interfere with the tool 16 is provided so as to be linked to the first link member. The bottom end of the lever 37 is bent at a substantial right angle whereby an operating part 37a is formed. The operating part 37a is arranged facing the opening part 106 of the cover 100, so a worker can operate the lever 37 through the opening part 106.

At the top end of the support part 28d, one end of a cross-sectional substantially U-shaped second link member 38 is attached pivotally about the shaft parts 38a. At the other end of the first link member 36 and the other end of the second link member 38, a pushing member 39 is attached pivotally through shaft parts 36b and 38b. At the two side ends of the pushing member 39, tabs 39a are provided so as to protrude toward the gripper 24. Between the pair of tabs 39a, a recessed space 39b is formed. As shown in FIG. 10, the pair of tabs 39a are arranged facing each other. The distance between the tabs 39a is gradually expanded toward the bottom. At the outsides at the top of the pair of gripping members 24a corresponding to the tabs 39a, slopes 24e are formed so as to expand the further downward.

Figure 11B:
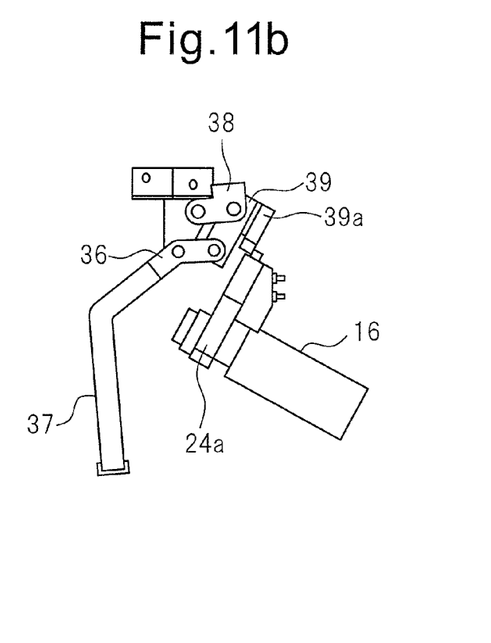

FIG. 11a to FIG. 11d are views which show an example of the tool replacing work. At the time of tool replacement, first, the tilting cylinder 52 is driven, as shown in FIG. 9, to make the tilt angle α of the tool magazine 22 with respect to the vertical line α2. In this state, due to the rotation of the tool magazine 22, as shown in FIG. 11a, a tool 16 which requires replacement is moved to the tool replacing position (position Pc of FIG. 9) below the pushing member 39 of the tool replacing device 35. Next, the door 108 of the right surface cover 100 is opened and the lever 37 is lifted up through the opening part 106. Due to this, as shown in FIG. 11b, the pushing member 39 descends through the first link member 36 while approaching the gripper 24 and the second link member 38 and the bottom ends of the tabs 39a abut against the outsides of the top parts of the gripping members 24a.

Figure 11C:
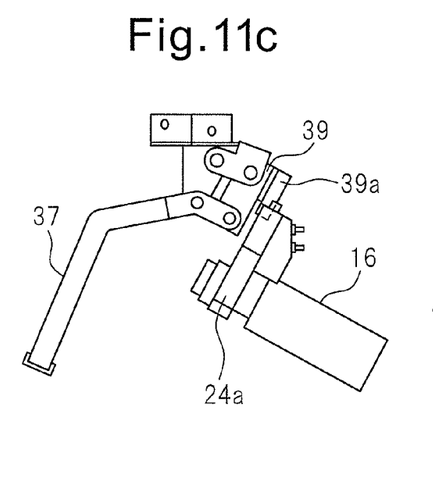
Figure 11D:
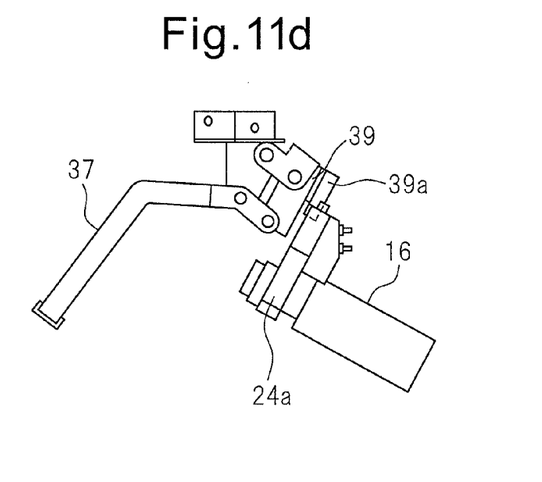

If further lifting up the lever 37 from this state, as shown in FIG. 11c, the pushing member 39 further descends and the tabs 39a push against the slopes 24e at the top of the gripping members 24a. At this time, the distance between the pair of tabs 39a becomes narrower toward the top. Therefore, along with descent of the tabs 39a, the springs 24d at the inside of the gripping members 24a are compressed, the pair of gripping member 24a approach each other at their top ends, and the bottom ends are separated. As shown in FIG. 11d, if lifting the lever 37 to the maximum, the bottom end sides of the pair of gripping members 24a are pushed open to the maximum. Due to this, the tool 16 can be detached from the curved projecting parts 24c of the gripper 24 (FIG. 7).

After this, when attaching a new tool 16 to the gripper 24, the tool 16 is inserted between the curved projecting parts 24c of the gripping member 24a from the bottom and the lever 37 is operated to return it by a procedure opposite to that explained above. The above tool replacement work can be carried out regardless of the shutter 26 being open or closed.

The machining center according to the present embodiment has a control device. Here, the operation of the machining center, in particular the tool changing operation and tool replacing operation will be explained. FIG. 12 is a block diagram which shows the configuration of the control device.

The control device has an input device 41 which inputs various information relating to tool change and tool replacement, a shutter opening and closing detector 42 which detects an open and closed state of the shutter 26, a spindle position detector 43 which detects the position of the spindle 15, a clamped state detector 44 which detects a clamped state of a tool 16 which is attached to the spindle 15, a posture detector 45 which detects a posture of the tool magazine 21, an indexing position detector 46 which detects an indexing position of the tool magazine 22, a control unit 40 which carries out predetermined processing based on signals from these input device 41, shutter opening and closing detector 42, spindle position detector 43, clamped state detector 44, posture detector 45, and indexing position detector 46. Further, the control device has an indexing motor 50, a spindle control motor 51, tilt use cylinder 52, opening/closing use cylinder 53, clamping device 54, and lock mechanism actuator 55 which are controlled by signals from the control unit 40.

The input device 41 includes a control panel 110 and a reading unit of an NC program. The shutter opening and closing detector 42 is, for example, configured by a switch which turns on at the open position of the shutter 26 and turns off at the closed position. The spindle position detector 43 is configured by rotation detectors which are attached to the X-axis use, Y-axis use, and Z-axis use servo motors. The clamped state detector 44 is, for example, configured by a switch which turns on when the clamping device 54 operates to clamp a tool 16 and turns off when it operates to unclamp the tool. The posture detector 45 is, for example, configured by a switch which turns on and off in accordance with extension and retraction of the tilt use cylinder 52 and detects the first tilted posture of the tilt angle $\alpha=\alpha 1$ and the second tilted posture of the tilt angle $\alpha=\alpha 2$. The indexing position detector 46 is, for example, configured by a rotation detector which is attached to the indexing motor 50. The spindle control motor 51 includes an X-axis use, Y-axis use, and Z-axis use servo motors (X-axis use motor 51a, Y-axis use motor 51b, and Z-axis use motor 51c) and a spindle motor 51d for rotating the spindle. The lock mechanism actuator 55 is an actuator which operates a lock mechanism 109 (FIG. 5) and can be configured by a solenoid, air cylinder, etc.

The control unit 40 is configured including a processing system having a CPU, ROM, RAM, or other peripheral circuits, etc. The control unit 40 has a tool changing processing unit 40a which executes processing relating to tool change (tool changing processing) and a tool replacing processing unit 40b which executes processing relating to tool replacement (tool replacing processing).

Below, tool changing processing will be explained. Tool changing processing is started when a tool changing command is input from the input device 41. Here, the processing from the state of machining a workpiece in the work space WS by running an NC program will be explained. At the time of machining a workpiece, the tool magazine 22 is indexed to the reference state, the tilt angle of the tool magazine 22 is made $\alpha 1$, and the shutter 26 is closed.

If a tool change command is input, first, the control unit 40 outputs a control signal to the spindle motor 51d to rotate the spindle 15 stop and outputs control signals to the X-axis use motor 51a and Z-axis use motor 51c to, as shown in FIG. 6, make the positions of the spindle 15 in the front-back direction (Z-axis direction) and left-right direction (X-axis direction) match with the tool changing position Pa (called "preparatory position Pb"). FIG. 6 shows the up limit position and down limit position of the spindle 15 at the time of machining a workpiece by Pu and Pd. The tool changing position Pa is positioned at the outside of the range of movement of this spindle 15, that is, upward in the up limit position Pu. The stroke of movement between the up limit position Pu and tool changing position Pa is set for tool changing.

If the spindle position detector 43 detects movement of the spindle 15 to the preparatory position Pb, the control unit 40 outputs a control signal to the opening and closing use cylinder 53 to slide the shutter 26 to the front and open the opening part 25a. If the shutter opening and closing detector 42 detects the open state of the shutter 26, the control unit 40 outputs a control signal to the indexing motor 50 to index a gripper 24 to which no tool 16 is attached (so-called "free gripper") through the opening part 25a to the tool changing position Pa. This indexed state is confirmed by a detected value of the indexing position detector 46.

Next, the control unit 40 outputs a control signal to the Y-axis use motor 51b to move the spindle 15 to the upper tool changing position Pa. Due to this, as shown by the chain line of FIG. 6, the tool 16 which is attached to the spindle 15 is engaged with a gripper 24. If the spindle position detector 43 detects movement of the spindle 15 to the tool changing position Pa, the control unit 40 outputs a control signal to the clamping device 54 inside of the spindle 15 to unclamp the tool 16. Next, if the clamped state detector 44 detects unclamping of the tool 16, the control unit 40 outputs a control signal to the Z-axis use motor 51c to make the spindle 15 retract to the back until a position not interfering with the tool magazine 22. In this way, the tool 16 is transferred to the gripper 24.

If the spindle position detector 43 detects a retraction operation of the spindle 15, the control unit 40 outputs a control signal to the indexing motor 50 to index the tool 16 used for the next machining to the tool changing position Pa. Next, the control unit 40 outputs a control signal to the Z-axis use motor 51c to make the spindle 15 advance to the tool changing position Pa. If the spindle position detector 43 detects movement of the spindle 15 to the tool changing position Pa, the control unit 40 outputs a control signal to the clamping device 54 to clamp the tool 16 at the spindle 15. If the clamped state detector 44 detects clamping of the tool 16, the control unit 40 outputs a control signal to the Y-axis use motor 51b to move the spindle 15 and the tool 16 to the inside of work space WS (for example, the preparatory position Pb).

If the spindle position detector 43 detects movement of a tool 16 to the inside of the work space WS, the control unit 40 outputs a control signal to the indexing motor 50 to index the tool magazine 21 to the reference state (FIG. 7). If the indexing position detector 46 detects indexing of the tool magazine 21 to the reference state, the control unit 40 outputs a control signal to the opening and closing use cylinder 53 to slide the shutter 26 to the back and close the opening part 25a. If the shutter opening and closing detector 42 detects the closed state of the shutter 26, the control unit 40 outputs a control signal to the spindle motor 51d to drive rotation of the tool 16. After that, the control unit 40 runs the NC program to move the tool 16 relative to the workpiece W and machine the workpiece W.

Next, the tool replacing processing will be explained. The tool replacing processing is started when a tool replacing command is input from the input device 41. The tool replacing command is input, for example, if a tool replacing button which is provided on the control panel 110 is operated by a worker before starting to machine a workpiece or after finishing machining a workpiece. It is also possible to input a tool replacing command while machining a workpiece. In this case, as processing for interruption of the NC program, this tool replacing processing is carried out with priority over tool changing processing. Below, the operation when replacing a tool 16 which is attached to the tool magazine 22 in advance with another tool will be explained.

Before inputting a tool replacing command, the tool magazine 22 is set to the reference state of FIGS. 6 and 7 and the door 108 is locked at the closed state by the lock mechanism 109. If a tool replacing command is input, the control unit 40 outputs a control signal to the tilting cylinder 52 to, as shown in FIG. 9, make the tool magazine 22 tilt to the second tilted posture of $\alpha=\alpha 2$. If the posture detector 45 detects the second tilted posture, the control unit 40 outputs a control signal to the indexing motor 50 to index a tool 16 for replacement to a tool replacing position Pc below the pushing member 39 of the tool replacing device 35. This indexed state is confirmed by a detected value of the indexing position detector 46.

Next, the control unit 40 outputs a control signal to the actuator 55 to unlock the lock mechanism 109. When the lock mechanism 109 is unlocked, the worker opens the door 108 and raises the lever 37 of the tool replacing device 35 through the opening part 106. Due to this, as explained above, since the pushing member 39 of the tool replacing device 35 pushes against the slopes 24e of the gripping members 24a, it is possible to detach the tool 16 from the gripper 24. After detaching the tool 16, the worker inserts a new tool 16 at the inside of the pair of gripping members 24a and operates to return the lever 37 to its original position. Due to this, a new tool 16 is loaded at the gripper 24.

When the tool 16 finishes being attached, the worker closes the door 108 and operates a tool replacement completion button which is provided on the control panel 110. Due to this, the control unit 40 outputs a control signal to the actuator 55 to lock the lock mechanism 109 and outputs a control signal to the indexing motor 50 to index the tool magazine 22 to the reference state. Next, the control unit 40 outputs a control signal to the tilt use cylinder 52 to make the tool magazine 22 tilt to the first tilted posture of $\alpha=\alpha 1$ and ends the tool replacing processing. The control device 40 prohibits the drive operation of the indexing motor 50 when the tool magazine 22 is at the first tilted posture and the shutter 26 is in the closed state.

According to the above embodiment, grippers 24 are provided around a substantially circular rotating frame 23 and a tool-holding area AR1 is formed at the tool magazine 22. Further, part of the circumferential direction of the rotating frame 23 is cut away in a straight line and a tool-free area AR2 where there are no grippers 24 is formed. Further, when closing the shutter 26, the tool magazine 22 is indexed to the reference state where the tool-free area AR2 becomes the lowest part, while when opening the shutter 26, the tool magazine 22 is indexed so that a tool 16 inside the tool-holding area AR1 moves to the tool changing position P0. Due to this, at the time of tool changing, it is possible to avoid interference between the tool magazine 22 and the shutter 26 while arranging the tool magazine 22 in proximity to the horizontal cover 25. Therefore, the tool magazine 22 can be arranged at a low position and the machine can be lowered in overall height and raised in stability.

Further, the tilt use cylinder 52 is used to support the tool magazine 22 in a tiltable manner, at the time of tool changing, the tilt angle $\alpha$ of the tool magazine 22 is controlled to $\alpha 1$ corresponding to the tool changing position Pa, and, at the time of tool replacing, the tilt angle $\alpha$ is controlled to $\alpha 2$ corresponding to the tool replacing position Pc. Due to this, the tool replacing device 35 can be attached without being limited by the tool changing position Pa, so attachment of the tool replacing device 35 becomes easy. In this case, the tilt angle $\alpha 2$ at the time of replacing a tool is smaller than the tilt angle $\alpha 1$ at the time of tool changing, so the tool magazine 22 can be tilted to a posture closer to the horizontal and the tool magazine 22 can be made to rotate without interfering with the shutter 26 when the shutter 26 is closed. Therefore, even while machining a workpiece, tool replacement work becomes possible, so the work efficiency can be improved.

In the above embodiment, part of a circle is cut to a straight line to form the rotating frame 23 of the tool magazine 22 and the grippers 24 are provided at the arc part 23a of the rotating frame 23. However, so long as forming a tool-free area AR2 at part of the circumferential direction of the rotating frame 23 so as to be able to arrange the tool magazine 22 tilted to a low position not interfering with the horizontal cover 25, the rotating frame 23 is not limited to the configuration described above.

In the above embodiment, although the shutter 26 is provided slidably at the horizontal cover 25 below the tool magazine 22 so as to open and close the opening part 25a, the shutter may be configured in any way. It is also possible to use an opening and closing drive unit other than the opening and closing use cylinder 53 to open and close the shutter 26. It is also possible to use a rotation drive unit other than the indexing motor 50 to rotate the tool magazine 22. The tool holding part comprised of the gripper 24 may be configured in any way. If controlling the opening and closing use cylinder 53 and indexing motor 50 so that when the shutter 26 is closed, the tool-free area AR2 is moved to the spindle 15 side (tool changing position Pa), while when the shutter 26 is open, the tool-holding area AR1 moves to the spindle 15 side, the control unit 40 is not limited to the configuration described above.

In the above embodiment, the tilt use cylinder 52 is extended and retracted to change the tilt angle $\alpha$ of the tool magazine. However, so long as it is possible to change the tilt angle $\alpha$ between a tilt angle $\alpha 1$ which enables a tool 16 held by a gripper 24 to be moved to the tool changing position Pa (first tilt angle) and a tilt angle $\alpha 2$ which enables the tool replacing device 35 to operate (second tilt angle), the tilt angle changing unit may be configured in any way. The tool replacing device 35 for attaching and detaching tools 16 to and from grippers 24 is not limited in configuration and mounting positions to those explained above. For example, it is also possible that there be no tool replacing device 35, that only a tool replacing position Pc be set, and that a handheld lever which pries open a gripper 24 be used to replace a tool 16.

According to the present invention, a tool-free area is formed at a part of the circumferential direction of the tool magazine which is arranged tilted. When closing the shutter, the tool-free area moves to the spindle side, while when opening the shutter, the tool-holding area moves to the spindle side. Due to this, it is possible to arrange the tool magazine at a low position while avoiding interference between the tool magazine and the tool magazine cover at the time of tool changing.

The invention claimed is:

1. A machining center, comprising:
   a spindle to which a tool is attached in a detachable manner;
   a tool magazine provided in a tilted posture such that a rotation axis of the tool magazine is inclined with respect to horizontal and vertical directions, wherein the tool magazine is provided above a work space in which the spindle processes a workpiece, wherein the tool magazine is provided so that an end of the tool magazine that is closest to the spindle is lower than an end of the tool magazine that is farthest from the spindle, the tool magazine being rotatable and indexable about the rotation axis and having a plurality of tool holding parts for holding tools at locations along a circumference of the tool magazine, which tools are provided so as to be exchanged with, via relative movements of the tool magazine and the spindle, a tool held by the spindle;
   a shutter arranged in an openable and closable manner at a boundary between the tool magazine and the work space;
   a rotation drive unit rotating the tool magazine about the rotation axis;
   an opening and closing drive unit opening and closing the shutter; and
   a control unit controlling the rotation drive unit and the opening and closing drive unit wherein,
   the tool magazine has a tool-free area in which there are no tool holding parts at a part of the circumference of the tool magazine and has a tool-holding area in which there are tool holding parts at another part of the circumference of the tool magazine and
   the control unit controls the rotation drive unit and the opening and closing drive unit so that when the shutter is open, the tool-holding area of the tool magazine moves to be the end of the tool magazine that is closest to the spindle, and so that when the tool-free area moves to be the end of the tool magazine that is closest to the spindle, the shutter closes.

2. The machining center according to claim 1, wherein the tool magazine has a rotating frame rotating about a center part of the rotating frame, and wherein the circumference of the tool magazine is an outer circumference that is formed by an arc part and a chord part, and the tool holding parts are provided at the rotating frame along the arc part.

3. The machining center according to claim 2, further comprising a tilt angle changing unit changing a first tilt angle of the rotation axis of the tool magazine with respect to a vertical line to another tilt angle, such that the another tilt angle is such that the rotation axis of the tool magazine is closer to being vertical than when the tool magazine is located at the first tilt angle,
   wherein the control unit controls the rotation drive unit and the opening and closing drive unit so that the tool-holding area can move to be the end of the tool magazine that is closest to the spindle even when the shutter is closed when the tilt angle changing unit changes the tilt angle to the another tilt angle.

4. The machining center according to claim 1, further comprising a tilt angle changing unit changing a first tilt angle of the rotation axis of the tool magazine with respect to a vertical line to another tilt angle, such that the another tilt angle is such that the rotation axis of the tool magazine is closer to being vertical than when the tool magazine is located at the first tilt angle,
   wherein the control unit controls the rotation drive unit and the opening and closing drive unit so that the tool-holding area can move to be the end of the tool magazine that is closest to the spindle even when the shutter is closed when the tilt angle changing unit changes the tilt angle to the another tilt angle.

* * * * *